United States Patent
Ganesan (10) Patent No.: US 9,553,996 B2
(45) Date of Patent: *Jan. 24, 2017

(54) ACCESS POINT WITH CONTROLLER FOR BILLING AND GENERATING INCOME FOR ACCESS POINT OWNER

(71) Applicant: Vasu Networks Corporation, Cupertino, CA (US)

(72) Inventor: Vasudevan Ganesan, Cupertino, CA (US)

(73) Assignee: Vasu Networks Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,520

(22) Filed: Sep. 29, 2015

(65) Prior Publication Data

US 2016/0021259 A1    Jan. 21, 2016

Related U.S. Application Data

(63) Continuation of application No. 14/539,907, filed on Nov. 12, 2014, now Pat. No. 9,179,006, which is a
(Continued)

(51) Int. Cl.
*H04W 4/24* (2009.01)
*H04W 4/26* (2009.01)
(Continued)

(52) U.S. Cl.
CPC .............. *H04M 15/41* (2013.01); *H04L 12/14* (2013.01); *H04L 12/1428* (2013.01);
(Continued)

(58) Field of Classification Search
CPC ........ H04L 12/56; H04L 2/14; H04L 12/1428; H04L 29/06027; H04L 65/4092; H04L 65/607;H04M 15/61; H04M 15/58; H04W 4/24; H04W 4/26
See application file for complete search history.

(56) References Cited

U.S. PATENT DOCUMENTS 6,009,328 A    12/1999  Muszynski
6,175,737 B1    1/2001  Kao
(Continued)

FOREIGN PATENT DOCUMENTS

DE    200310113    1/2004
EP    0936777 A1    8/1999
(Continued)

OTHER PUBLICATIONS

3GPP Organization Project, "3rd Generation Partnership Project-;Technical Specification Group Services and System Aspects Service aspects; Handover requirements between UTRAN and GERAN or other radio systems (Release 8)", Mar. 2006, pp. 1-20.
(Continued)

*Primary Examiner* — Sonia Gay
(74) *Attorney, Agent, or Firm* — Haverstock & Owens LLP (57) ABSTRACT

A modified end user network access point includes a switching module and a controller to track usage of the end user network access point by wirelessly connected end user devices. The tracked usage information is transmitted from the end user network access point to a remotely coupled data center. The data center collects usage information from a plurality of different end user network access points. The collected usage information is in turn transmitted from the data center to a network carrier. The network carrier uses the received usage information to bill users for accessing the end user network access points and using any services provided by the end user network access points. An owner of each end user network access point is compensated by the network carrier each instance that an end user device utilizes
(Continued)

the end user network access point to access the network carrier's communications network.

61 Claims, 3 Drawing Sheets

Related U.S. Application Data continuation of application No. 11/262,078, filed on Oct. 27, 2005, now Pat. No. 8,913,604, which is a continuation-in-part of application No. 11/031,498, filed on Jan. 6, 2005, now Pat. No. 7,991,399.

(60) Provisional application No. 60/652,258, filed on Feb. 11, 2005, provisional application No. 60/534,466, filed on Jan. 6, 2004.

(51) Int. Cl.
*H04L 12/14* (2006.01)
*H04L 29/06* (2006.01)
*H04M 15/00* (2006.01)

(52) U.S. Cl.
CPC .... *H04L 29/06027* (2013.01); *H04L 65/4092* (2013.01); *H04L 65/607* (2013.01); *H04M 15/58* (2013.01); *H04M 15/61* (2013.01); *H04W 4/24* (2013.01); *H04W 4/26* (2013.01)

(56) References Cited

U.S. PATENT DOCUMENTS

| | | |
|---|---|---|
| 6,195,543 B1 | 2/2001 | Granberg |
| 6,473,413 B1 | 10/2002 | Chiou et al. |
| 6,515,983 B1 | 2/2003 | Utas |
| 6,553,022 B2 | 4/2003 | Hartmaier |
| 6,584,087 B1 | 6/2003 | Czaja et al. |
| 6,754,833 B1 | 6/2004 | Black et al. |
| 6,795,700 B2 | 9/2004 | Karaoguz et al. |
| 6,862,444 B2 | 3/2005 | Karaoguz et al. |
| 6,996,107 B2 | 2/2006 | Janoska |
| 7,127,232 B2 | 10/2006 | O'Neil et al. |
| 7,142,847 B2 | 11/2006 | Umeda et al. |
| 7,254,119 B2 | 8/2007 | Jiang et al. |
| 7,382,763 B2 | 6/2008 | Ludwig et al. |
| 7,398,088 B2 | 7/2008 | Belkin et al. |
| 7,483,984 B1 | 1/2009 | Jonker et al. |
| 7,512,796 B2 | 3/2009 | Haverinen et al. |
| 8,041,360 B2 | 10/2011 | Ibe et al. |
| 8,514,867 B2 | 8/2013 | Ganesan |
| 8,520,605 B2 | 8/2013 | Ganesan |
| 8,958,434 B2 | 2/2015 | Ganesan |
| 2001/0049790 A1 | 12/2001 | Faccin et al. |
| 2002/0078174 A1 | 6/2002 | Sim et al. |
| 2002/0085516 A1 | 7/2002 | Bridgelall |
| 2002/0114305 A1 | 8/2002 | Oyama et al. |
| 2002/0147008 A1 | 10/2002 | Kallio |
| 2002/0150228 A1 | 10/2002 | Umeda et al. |
| 2002/0183038 A1 | 12/2002 | Comstock et al. |
| 2003/0012350 A1 | 1/2003 | Wong et al. |
| 2003/0053632 A1 | 3/2003 | Bousis |
| 2003/0083079 A1 | 5/2003 | Clark et al. |
| 2003/0086366 A1 | 5/2003 | Branlund et al. |
| 2003/0087629 A1 | 5/2003 | Juitt et al. |
| 2003/0112766 A1 | 6/2003 | Riedel et al. |
| 2003/0157899 A1 | 8/2003 | Trossen et al. |
| 2003/0177196 A1 | 9/2003 | Bhasin et al. |
| 2003/0185172 A1 | 10/2003 | Rue |
| 2003/0217007 A1 | 11/2003 | Fukushima et al. |
| 2003/0217091 A1 | 11/2003 | Echigo et al. |
| 2003/0224792 A1 | 12/2003 | Verma et al. |
| 2003/0232615 A1 | 12/2003 | Kim et al. |
| 2004/0005878 A1 | 1/2004 | Olin et al. |
| 2004/0030791 A1 | 2/2004 | Dorenbosch et al. |
| 2004/0085959 A1 | 5/2004 | Ohkawa |
| 2004/0087307 A1 | 5/2004 | Ibe et al. |
| 2004/0105424 A1 | 6/2004 | Skoczkowski et al. |
| 2004/0114559 A1 | 6/2004 | Wang |
| 2004/0127208 A1 | 7/2004 | Nair et al. |
| 2004/0132427 A1 | 7/2004 | Lee et al. |
| 2004/0137902 A1 | 7/2004 | Chaskar et al. |
| 2004/0141484 A1 | 7/2004 | Rogalski et al. |
| 2004/0174880 A1 | 9/2004 | White et al. |
| 2004/0176128 A1 | 9/2004 | Grabelsky et al. |
| 2004/0181811 A1 | 9/2004 | Rakib |
| 2004/0192294 A1 | 9/2004 | Pan et al. |
| 2004/0203666 A1 | 10/2004 | Foster et al. |
| 2004/0203788 A1 | 10/2004 | Fors et al. |
| 2004/0203802 A1 | 10/2004 | McCormick et al. |
| 2004/0204097 A1 | 10/2004 | Scheinert et al. |
| 2004/0205158 A1 | 10/2004 | Hsu |
| 2004/0218575 A1 | 11/2004 | Ibe et al. |
| 2004/0229618 A1 | 11/2004 | Adatrao et al. |
| 2004/0246990 A1 | 12/2004 | Krishnamurthi et al. |
| 2005/0044138 A1 | 2/2005 | Albert et al. |
| 2005/0059400 A1 | 3/2005 | Jagadeesan et al. |
| 2005/0090259 A1 | 4/2005 | Jain et al. |
| 2005/0147049 A1 | 7/2005 | Ganesan |
| 2005/0149740 A1 | 7/2005 | Kotzin et al. |
| 2006/0040711 A1 | 2/2006 | Whistler |
| 2006/0050663 A1 | 3/2006 | Ganesan |
| 2006/0050687 A1 | 3/2006 | Ganesan |
| 2006/0050721 A1 | 3/2006 | Ganesan |
| 2006/0080423 A1 | 4/2006 | Brewer et al. |
| 2006/0098643 A1 | 5/2006 | Pfeffer |
| 2006/0146767 A1 | 7/2006 | Moganti |
| 2006/0234678 A1 | 10/2006 | Juitt et al. |
| 2006/0291455 A1 | 12/2006 | Katz et al. |
| 2007/0076665 A1 | 4/2007 | Nair et al. |
| 2007/0112948 A1 | 5/2007 | Uhlik |
| 2007/0124490 A1 | 5/2007 | Kalavade et al. |
| 2007/0249390 A1 | 10/2007 | Purkayastha et al. |
| 2009/0070489 A1 | 3/2009 | Lu et al. |
| 2010/0074228 A1 | 3/2010 | Hicks et al. |
| 2011/0010282 A1 | 1/2011 | Olin et al. |

FOREIGN PATENT DOCUMENTS

| | | | |
|---|---|---|---|
| EP | 1471665 | A1 | 10/2004 |
| GB | 2287858 | A | 9/1995 |
| JP | 200226994 | A | 1/2002 |
| JP | 2004320473 | A | 11/2004 |
| WO | 03056719 | A1 | 7/2003 |
| WO | 2004013998 | A2 | 2/2004 |
| WO | 03061177 | A3 | 7/2004 |
| WO | 2003061177 | A2 | 7/2004 |
| WO | 2004057903 | A1 | 7/2004 |

OTHER PUBLICATIONS

3GPP Organization Project, "3rd Generation Partnership Project; Technical Specification Group Services and System Aspects Service aspects; Service principles (Release 8)", Mar. 2006, pp. 1-45.
3GPP Organization Project, 3rd Generation Partnership Projects;Technical Specification Group Services and System Aspects; Service Requirements for the All-IP Network (AIPN); V8.0.0, Stage 1, (Release 8), p. 1-24.
"Unlicensed Mobile Access (UMA); Protocols (Stage 3)", R1.0.4, May 2, 2005, pp. 1-162.

ACCESS POINT WITH CONTROLLER FOR BILLING AND GENERATING INCOME FOR ACCESS POINT OWNER

RELATED APPLICATIONS

This patent application is a continuation application of co-pending U.S. patent application Ser. No. 14/539,907, filed on Nov. 12, 2014, and entitled "ACCESS POINT WITH CONTROLLER FOR BILLING AND GENERATING INCOME FOR ACCESS POINT OWNER," which is a continuation application of U.S. patent application Ser. No. 11/262,078, filed on Oct. 27, 2005, and entitled "ACCESS POINT WITH CONTROLLER FOR BILLING AND GENERATING INCOME FOR ACCESS POINT OWNER," which application claims priority of U.S. provisional application, Ser. No. 60/652,258, filed Feb. 11, 2005, and entitled "METHOD OF AND APPARATUS FOR CONTROLLING BROADBAND ACCESS AND DISTRIBUTION OF CONTENT AND COMMUNICATIONS THROUGH AN ACCESS POINT," by the same inventors, which are all incorporated by reference. This application incorporates U.S. provisional application, Ser. No. 60/652,258 in its entirety by reference. U.S. patent application Ser. No. 11/262,078, filed on Oct. 27, 2005, and entitled "ACCESS POINT WITH CONTROLLER FOR BILLING AND GENERATING INCOME FOR ACCESS POINT OWNER," is also a continuation-in-part of U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference. U.S. patent application Ser. No. 11/031,498 claims priority of U.S. provisional application, Ser. No. 60/534,466, filed Jan. 6, 2004, and entitled "RADIOTELEPHONE WITH AUTOMATIC SWITCHING BETWEEN CELLULAR AND WI-FI NETWORKS USING WI-FI SIGNAL STRENGTH VALUES", the content of which is incorporated herein by reference in its entirety.

FIELD OF THE INVENTION

The present invention relates to a method of and an apparatus for providing access to a communications network and billing for related services. In particular, the present invention relates to a method of and apparatus for generating income for an owner of a network access device used to provide access to a communications network.

BACKGROUND OF THE INVENTION

A small portion of the radio frequency (RF) spectrum is assigned to each communications carrier. The assigned spectrum, therefore, must be used efficiently in order to allow the maximum number of frequency users to have access to this spectrum. Multiple access modulation techniques have been developed to provide optimum utilization of the RF spectrum. Examples of such modulation techniques include time division multiple access (TDMA), frequency division multiple access (FDMA), and code division multiple access (CDMA).

There is a wide variance in the performance of wireless networks. A conventional wireless cellular network covers a relatively large geographical area, but provides a relatively low bandwidth. Such wireless networks use regulated portions of the radio spectrum and are shared by many users. The infrastructure costs of wireless networks are relatively high due to the size and complexity of the cellular network equipment.

Other wireless networks, such as CDMA2000-EV-DO/DV networks, offer higher bandwidth and enhanced data services, such as web browsing. However, these networks also pack many users into a relatively small portion of the regulated spectrum. Other types of radio networks are adapted to improve spectral efficiency with increased speed and smaller coverage areas. For example, an IEEE 802.11x (or Wi-Fi) network may transmit at speeds up to 11 Mbps using a Direct Sequence Spread Spectrum (DSSS) mode or at speeds up to 54 Mbps using an Orthogonal Frequency Division Multiplexing (OFDM) mode.

An access point conforming to an IEEE 802.11X (e.g., IEEE 802.11b) network may cover an area of a few hundred feet in diameter. Each such access point is connected to a larger network (e.g., Internet). One such example is Wi-Fi VoIP (Wireless Fidelity Voice over Internet Protocol), through which a mobile device user can place a wireless telephone call over the Internet, using the technology specified in IEEE 802.11b at the network access point. VoIP is a method for taking analog audio signals and converting them into digital data that can be transmitted over the Internet. Conventional VoIP telephone communications are enabled by VoIP network carriers, which utilize VoIP networks, e.g. the Internet, to place VoIP based telephone calls. VoIP enabled and compatible networks include VoIP switching for proper routing and billing of VoIP based telephone calls.

In order to cover larger geographical areas, a relatively large number of IEEE 802.11x network access points and relatively large wire-line back haul networks are required. In part, due to the relatively small geographical coverage area of each network access point, the resulting FREE 802.11x based network may thus be prohibitively expensive to set up. Further, the small coverage areas may lead to many "dead zones" in which mobile device users are unable to place telephone calls using the VoIP network.

SUMMARY OF THE INVENTION

Embodiments of the present invention are directed to network access points with embedded switching capabilities. the network access points provide access to a communications network, preferably an IP network. The network access points provide end user devices access to the communications network. These network access points include virtual private network (VPN) and conventional network security technology to provide comprehensive security and privacy. A controller within the network access point utilizes a switching module to track usage of the network access point by wirelessly connected end user devices. Using the switching module, usage associated with each individual end user device is tracked to distinguish each end user device accessing the network access point. The tracked usage information is transmitted from the network access point to a remotely coupled data center. The data center collects usage information from a plurality of different network access points. The collected usage information is in turn transmitted from the data center to an network carrier, such as an IP network carrier or a telephone network carrier. The network carrier uses the received usage information to bill users for accessing the communications network via the network access points and using any services provided by the network access points.

In the preferred embodiment, the network access point tracks VoIP telephone usage by a wireless end user device accessing the network access point for the purpose of utilizing an IP network to make a telephone call. Alternatively, the wireless end user device utilizes the network access point to access an IP network for purposes other than making a telephone call, such as sending and receiving email or broadband content. In this alternative embodiment, the network access point tracks any usage of the network access point by the wireless end user device. The network access point provides additional services associated with accessing the IP network. Using the switching module, the network access point is also able to track usage of these additional services. In yet another alternative embodiment, the carrier network is any conventional communications network, and the network access points provide access to the communications network for end user devices.

In one embodiment, the end user device is configured to perform the necessary conversion of data for transmission over the IP network. For example, when a VoIP telephone call is made using the end user device, the end user device converts the audio signal to IP compatible digital data (e.g. VoIP conversion) and the converted digital data is sent to the network access point, for example using Wi-Fi.

In another embodiment, the network access point is configured to perform the necessary conversion of data for transmission over the IP network. For example, when a VoIP telephone call is made using the end user device, the end user device transmits the audio signal, for example an RF signal, to the network access point where the audio signal is converted to IP compatible digital data.

A network access point of the type described above is utilized as an extension of an existing communications network infrastructure. Entities other than the network carrier can implement the network access point and thereby provide users access to the communications network via their network access point. The network access point, using its embedded switching module, tracks any usage of the network access point by the end user device, and the tracked usage is provided to the network carrier for billing to the user. As compensation for providing this service, the owner of the network access point is remunerated by the network carrier according to an agreed upon schedule. The network carrier benefits by expanding the coverage area accessible to its communications network without having the up-front cost of expanding the network infrastructure itself.

BRIEF DESCRIPTION OF THE SEVERAL VIEWS OF THE DRAWINGS

The invention is described relative to the several views of the drawings. Where appropriate and only where identical elements are disclosed and shown in more than one drawing, the same reference numeral will be used to represent such identical elements.

DETAILED DESCRIPTION OF THE INVENTION

Figure 1:
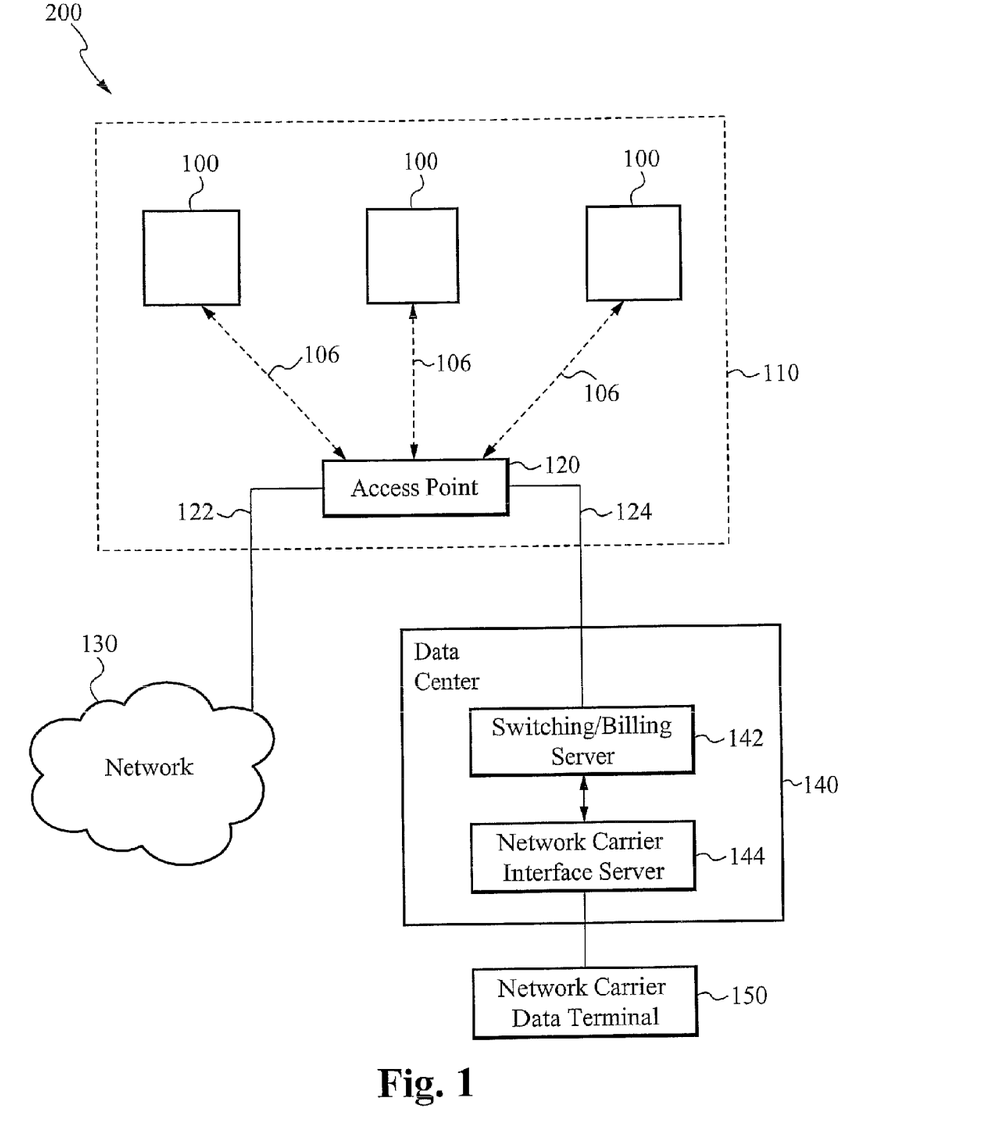
FIG. 1 illustrates an exemplary block diagram of a system implemented according to an embodiment of the present invention.

FIG. 1 illustrates an exemplary block diagram of a system 200 implemented according to one embodiment of the present invention. The system 200 includes a modified network access point 120 coupled to one or more end user devices 100. The access point 120 provides each end user device 100 with access to an network 130. Preferably, the network 130 is an IP network, such as the Internet. Alternatively, the network 130 is any type of conventional communications network. The access point 120 is coupled to the network 130 via the broadband connection 122. The broadband connection 122 is preferably a wired connection. Alternatively, the broadband connection 122 is a wireless connection. The access point 120 provides the end user devices 100 with access to the network 130 along with other services related to accessing the network 130. The access point 120 includes a switching module that enables the access point 120 to track the usage of the network 130, and any related services, by a specific end user device 100.

The access point 120 is coupled to a data center 140 via broadband connection 124. The broadband connection 124 can be either a wired or wireless broadband connection. The data center 140 includes a switching and billing server 142 and a network carrier interface server 144. The network carrier maintains the network 130. Usage information collected by the access point 120 is transmitted to the switching and billing server 142 within the data center 140. The switching and billing server 142 collects usage information for each end user device 100 that utilizes the access and services provided by the access point 120. The usage information is associated with a specific end user corresponding to each end user device 100.

The network carrier interface server 144 communicates with a network carrier data terminal 150. The network carrier data terminal 150 is associated with the network carrier that provides usage of the network 130 by the end user devices 100. The network carrier data terminal 150 includes user information associated with the end users of the end user devices 100. This user information is provided by the network carrier data terminal 150 to the network carrier interface server 144. The network carrier interface server 144 provides the user information to the switching and billing server 142. The usage information received from the access point 120 is matched to the user information received from the network carrier interface server 144 to form billing records associated with each end user. The billing records are periodically provided by the data center 140 to the network carrier data terminal 150. The network carrier uses the billing records to bill the corresponding end users for their access and use of the network 130 via the access point 120, and any associated other services provided.

The access point 120 preferably functions as a broadband termination point. As such, the access point 120 is considered an end user broadband network element within the network 110. The network 110 is preferably configured as either a home or enterprise network associated with the access point 120. Examples of a network access point include, but are not limited to, a wireless or wired broadband termination element, a wireless or wired modem, a wireless or wired router, and a Wi-Fi access point.

In an alternative embodiment, a broadband termination point is configured separately from the access point 120, yet within the network 110. In this alternative embodiment, the broadband termination point is coupled to the access point 120 via a broadband connection. The broadband connection can be a wired connection or a wireless connection.

The access point 120 is adapted to transmit signals to and receive signals from the network connections 106. Each of the network connections 106 can be either a wireless connection or a wired connection. Preferably, each of the end user devices 100 is a mobile, or wireless, device and the network connections 106 are wireless connections. Transmissions sent over the wireless connections are preferably transmitted according to Wi-Fi or any other wireless protocol capable of transmitting IP compatible data. Alternatively, the end user devices 100 are wired devices and the network connections 106 are wired connections. As such, the access point 120 can be configured for both wired and wireless network communications.

In one embodiment, the end user device 100 is configured to perform the necessary conversion of data for transmission over the network 130. For example, when a VoIP telephone call is made using the end user device 100, the end user device 100 converts the audio signal to IP compatible digital data (e.g. VoIP conversion) and the converted digital data is sent to the access point 120, for example using a Wi-Fi protocol.

In another embodiment, the access point 120 is configured to perform the necessary conversion of data for transmission over the network 130. For example, when a VoIP telephone call is made using the end user device 100, the end user device 100 transmits the audio signal, for example an RF signal, to the access point 120 where the audio signal is converted to IP compatible digital data.

Each of the end user devices 100 can be wireless, wired, or configured for both wireless and wired. Exemplary end user devices include, but are not limited to, computers, televisions, music players/recorders, PDAs, telephones, or any conventional end user device capable of sending and receiving communications over the network 130. The end user device can also be a mobile communications device configured to automatically switch an existing communication from a wireless cellular network (hereinafter alternatively referred to as cellular network) to a wireless IP network, or to switch an existing communication from an IP network to a cellular network. Such a mobile communication device is described in co-pending and co-owned U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference.

In the exemplary system 200 shown in FIG. 1, each end user device 100 is a wireless device coupled to the access point 120 via wireless connection 106. It is understood that the specific types of end user devices 100, and the specific transmission connections 106 made between the end user devices 100 and the access point 120 described above in relation to FIG. 1 are for exemplary purposes only.

As applied to the system 200, wired connections can be configured according to any conventional wired transmission technologies including, but not limited to, LANs, WANs, and the Internet. Wireless connections included within the system 200 can be configured according to any conventional wireless transmission technologies including, but not limited to, IEEE 802.11a/b/g and Wi-Max.

Figure 2:
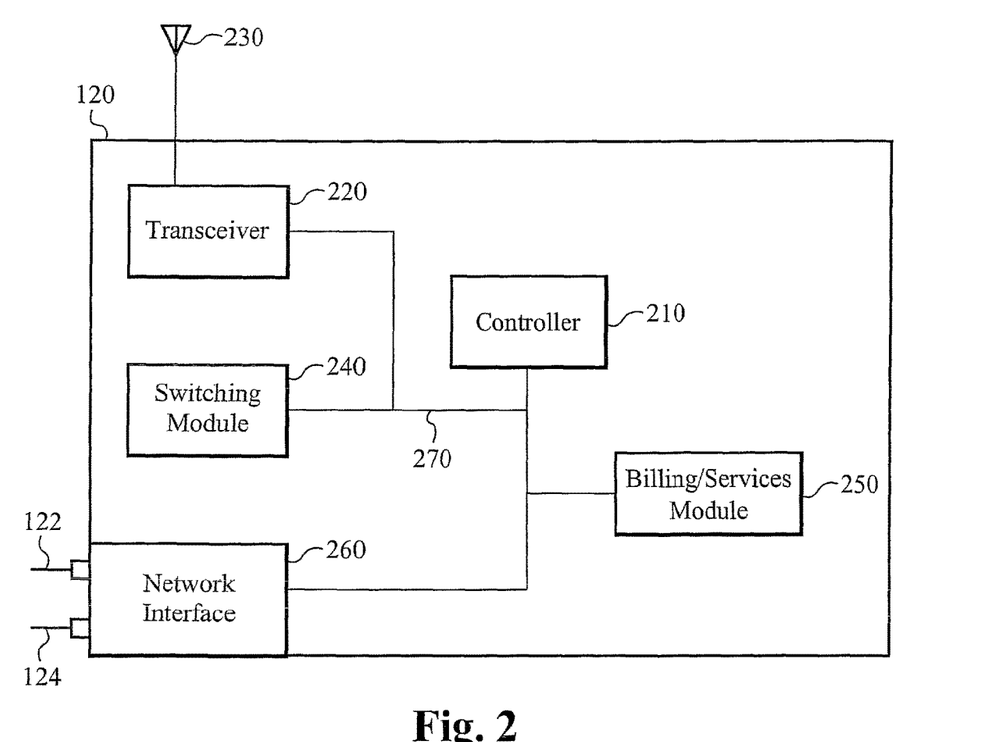
FIG. 2 illustrates a simplified high-level block diagram of the access point within FIG. 1, in accordance with one embodiment.

FIG. 2 illustrates a simplified high-level block diagram of the access point 120 within the system 200 of FIG. 1. The access point 120 includes a controller 210, a transceiver 220, a switching module 240, a billing and services module 250, and a network interface 260, all coupled together via a bus 270. An antenna 230 receives wireless signals from and transmits wireless signals to the end user devices 100 (FIG. 1). The transceiver 220 is adapted to transmit signals to and receive signals from the antenna 230. The network interface 260 includes network ports for the wired connection 122, which accesses the network 130 (FIG. 1), and the wired connection 124, which accesses the data center 140 (FIG. 1). Alternatively, the network interface 260 includes more, or less, than two network ports. Further, the network interface 260 alternatively includes a wireless network adapter (not shown) for providing wireless broadband network access to either the network 130 or the data center 140.

The switching module 240 provides tracking capabilities, such that when an end user device 100 utilizes the access point 120 to access the network 130, this usage is tracked and associated with the specific end user device 100. The access point 120 provides the end user device 100 with additional services associated with accessing the IP network 130. The switching module 240 enables tracking of these additional services. Tracking performed by the switching module 240 is sent as usage information to the billing and services module 250. The usage information, along with the particular end user device 100 associated with the usage information, is stored in the billing and services module 250. The usage information is transmitted from the billing and services module 250 to the data center 140 (FIG. 1) via the network interface 260. The controller 210 controls operation of the access point 120, including the transceiver 220, the switching module 240, the billing and services module 250, and the network interface 260.

In operation of the system 200 (FIG. 1), the access point 120 provides access to the network 130 when an end user device 100 is within the coverage area of the access point 120. Preferably, the end user device 100 is a mobile device that wirelessly connects to the access point 120. The wireless connection, and the mobile device, are preferably configured according to an IP compatible protocol, such as Wi-Fi. In addition to providing access to the network 130, the access point 120 provides additional services to the end user devices 100, such as managing the quality of broadband content provided from the network 130, or an otherwise connected broadband content provider.

The access point 120 includes a tracking capability that enables tracking of any usage of the access point 120 by a particular end user device 100. For example, if the end user device 100 is within the coverage area of the access point 120 and the end user device 100 utilizes the access point 120 to access the network 130 for the purposes of making a VoIP telephone call, the access point 120 tracks the duration of the VoIP telephone call over the network 130. This tracking information, also referred to as usage information, is collected by the access point 120 and associated with the particular end used device 100. The usage information is transmitted from the access point 120 to the data center 140, where the usage information is matched to user information received from the network carrier data terminal 150 to form a billing record. The network carrier data terminal 150 is associated with the network carrier that provides the communication over the network 130. The billing records are stored in the data center 140 and are periodically transmitted to the network carrier, via the network carrier data terminal 150.

Figure 3:
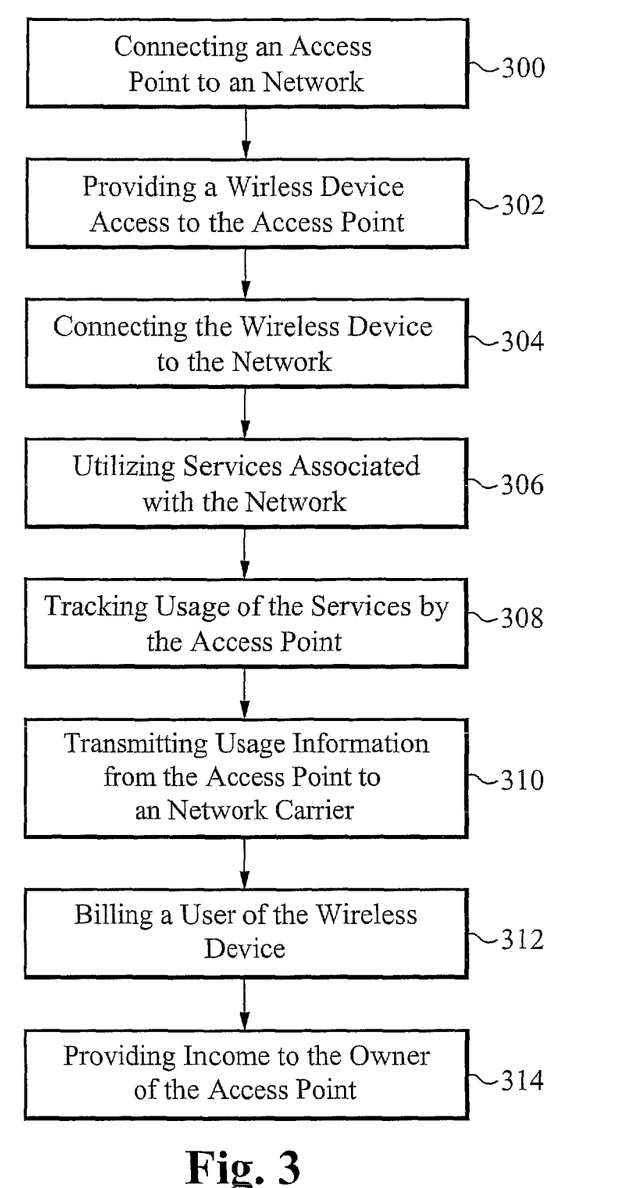
FIG. 3 illustrates an exemplary methodology to generate income for an owner of the network access point.

FIG. 3 illustrates an exemplary methodology to generate income for an owner of the access point 120. At the step 300, an access point is configured for access to an network. The access point is preferably connected to the network via a broadband connection, either wired or wireless. At the step 302, an end user device accesses the access point. The end user device is preferably a mobile, or wireless, device, and the wireless end user device communicates with the access point via a wireless connection. Access to the access point is enabled while the wireless end user device is within a coverage area of the access point.

At the step 304, once the end user device is provided access to the access point, the access point provides a connection to the network, thereby providing a communication link between the end user device and the network. The communication link can be used for a VoIP telephone call, transmission of broadband content to the end user device, or other data transmission applications. At the step 306, the end user device utilizes one or more services associated with the network. Preferably, the access point enables use of these services. At a minimum, one service utilized by the end user device is using the access point to access the network. In this case, the duration of time that a particular end user device is connected to the network via the access point is tracked and associated with the particular end user device. If content data is accessed by the end user device via the access point, then the type of content data can be tracked. In general, any utilization of the one or more services can be tracked.

At the step 308, services used by the end user device are tracked by the access point. Usage information corresponding to services used by a particular end user device is associated with the particular end user device. The usage information, including its associated end user device, is collected and stored by the access point. At the step 310, the usage information is first transmitted from the access point to a data center. The data center includes a switching and billing server that receives the usage information from the access point. The data center also includes an network carrier interface server that receives user information from the network carrier associated with the network. The switching and billing server receives the user information from the network carrier interface server and matches the user information to the usage information received from the access point to form billing records. The billing records are then transmitted to the network carrier. At the step 312, the network carrier uses the billing records to bill the user of the end user device that utilized the network via the access point. At the step 314, income is provided to the third party owner of the access point. The income provided is determined by a payment schedule previously agreed to by the network carrier and the third party owner.

The network access point is preferably owned by a third party independent of the network carrier. A portion of the revenue collected from end users for accessing the communications network via the network access point is distributed to the third party owner. The communications network is essentially expanded by the network access points without the network carrier paying the capital expenditures required in building out the carrier network. Instead, the capital expenditure burden is assumed by the third party owner of the network access point, and in exchange, the third party owner shares in any revenue collected by the network carrier from end users accessing the carrier network via the network access point. Alternatively, the third party owner is compensated based upon previously agreed upon parameters, as a per minute fee, independent of the billing charges or revenue collected between the end user and the network carrier. It is understood that an end user device can also be a third party owner.

The system 200 (FIG. 1) enables an end user to place a telephone call using a wireless device over a network. Although the system 200 is described above related to placing a VoIP telephone call, the system 200 can also be utilized for purposes other than placing phone calls, such as for example transmitting broadband content. Broadband content includes content data, such as audio and/or video content data, as well as content header data that provides information related to the accompanying audio/video content data. Examples of content header data include content origination address, content specific information, video parameters, audio parameters, and transmission media-specific parameters. Broadband content is provided from a broadband provider (not shown) to the end user devices 100 via the access point 120. The broadband provider can be the network carrier that provides the network 130, or the broadband provider can be an independent network provider, such as an ISP, that provides the end user access to a network.

Other than providing access to the network 130, an exemplary service provided by the access point 120 is to manage and selectively process broadband content transmitted to the end user devices 100 from a content provider. The access point 120 is preferably configured to perform such management and selective processing of the broadband content according to the co-owned, co-pending U.S. patent application Ser. No. 11/261,153, filed on Oct. 27, 2005, and entitled "APPARATUS FOR CONTROLLING BROADBAND ACCESS AND DISTRIBUTION OF CONTENT AND COMMUNICATIONS THROUGH AN ACCESS POINT", and co-owned, co-pending U.S. patent application Ser. No. 11/262,156, filed on Oct. 27, 2005, and entitled "METHOD OF PROVIDING BROADBAND CONTENT TO AN END USER DEVICE", which are hereby incorporated by reference.

As described above in relation to the system 200 in FIG. 1, a single access point 120 is coupled to the data center 140. It is understood that more than one access point 120 can be coupled to the data center 140, and that more than one data center 140 can be coupled to a plurality of access points 120, to receive usage information associated with the end user devices 100. Each data center 140 in turn provides the usage information for billing purposes to the network carrier.

Although the data center 140 is shown in FIG. 1 as separate from the network 130, the data center 140 can be coupled to the access point 120 via the network 130. The access point 120 can thereby provide the end user device 100 with access to the network 130 and communicate with the data center 140 either via the single broadband connection 122 or via multiple separate broadband connections to the network 130.

The above embodiments of the present invention are illustrative and not limiting. Various alternatives and equivalents are possible. It is understood that the functionality associated with any blocks described above may be centralized or distributed, whether locally or remotely. It is also understood that one or more blocks of each mobile communication device may be performed by hardware, firmware or software, or some combinations thereof. The present invention is not limited by the network. The network access point can be configured to provide access to any conventional communications network. The present invention is not limited by the Wi-Fi signals, such as those defined by IEEE 802.11x, where x may be a, b, g, or Wi-MAX used to carry VoIP communication. The present invention is not limited by the type of integrated circuit(s) in which the present invention may be disposed. Nor is the present invention limited to any specific type of process technology, e.g., CMOS, Bipolar, or BICMOS that may be used to manufacture the present invention.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

I claim:

1. A system to generate income for an owner of an end user network access point, the system comprising:
   a. one or more end user devices;
   b. one or more network nodes including an end user network access point in communication with the one or more end user devices, wherein the one or more network nodes provide the one or more end user devices access to a communications network with the end user network access point being the initial point of access to the communications network, further wherein the end user network access point includes a switching module that collects usage information including first end user identification information associated with each end user device that accesses the communications network via the end user network access access point;
   c. a data center in communication with the end user network access point, wherein the end user network access point transmits the usage information to the data center to be stored as a billing record; and
   d. a network carrier of the communications network to receive the billing record, to charge one or more of the end user devices based on the billing record and to provide an income to an owner of the end user network access point, associated with the billing record, wherein the owner of the end user access point is an entity other than the network carrier, wherein the data center matches the first end user identification information of the usage information to second end user identification information received from the network carrier corresponding to the communications network to form the billing record.

2. The system of claim 1 further comprising a plurality of end user network access points coupled to the data center, wherein the data center receives usage information transmitted from each of the plurality of end user network access points.

3. The system of claim 1 wherein the one or more end user devices are wireless end user devices and the one or more wireless end user devices are in communication with the end user network access point via wireless connections.

4. The system of claim 1 wherein the end user network access point enables transmission of broadband content to the one or more end user devices.

5. The system of claim 1 wherein the usage information includes a time duration that a first end user device utilizes the end user network access point to access the communications network.

6. The system of claim 5 wherein the end user network access point provides the one or more end user devices access to services related to the communications network.

7. The system of claim 6 wherein the usage information includes a type of service accessed by the first end user device.

8. The system of claim 1 wherein the end user network access point further comprises:
   a. a network interface unit in communication with the end user network access device, the end user device and the communications network, wherein the network interface is in communication with the switching module; and
   b. a controller in communication with the network interface unit and the switching module, wherein the end user network access device provides the end user device access to the communications network.

9. The system of claim 1 wherein the communications network is a VoIP compatible network and the end user network access point is a VoIP compatible network access point.

10. The system of claim 1 wherein the end user network access point enables a telephone call from one of the one or more end user devices over the communications network.

11. The system of claim 1 further comprising a data terminal in communication with the data center, wherein the data terminal is associated with the network carrier and the network carrier operates the communications network, further wherein the data center receives user information associated with users of the one or more end user devices from the data terminal and matches the user information to the usage information to form the billing record.

12. A method of generating income for an owner of an end user network access point, the method comprising:
   a. providing an end user device access to a communications network via one or more network nodes including the end user network access point, with the end user network access point being the initial point of access to the communications network;
   b. utilizing one or more services associated with the communications network by the end user device;
   c. tracking usage of the one or more services as usage information including first end user identification, wherein tracking is performed by the end user network access point;
   d. matching the first end user identification information of the usage information to second end user identification information received from a network carrier corresponding to the communications network to form a billing record;
   e. transmitting the billing record to a network carrier corresponding to the communications network; and
   f. providing income to the owner of the end user network access point by the network carrier in relation to the billing record, wherein the owner of the end user access point is an entity other than the network carrier.

13. The method of claim 12 further comprising billing a user of the end user device according to the billing record.

14. The method of claim 12 wherein tracking usage comprises tracking a duration of time that the end user device accesses the communications network via the end user network access point.

15. The method of claim 14 wherein tracking the duration of time is performed utilizing a switching capability within the end user network access point.

16. The method of claim 12 further comprising transmitting billing records from a plurality of end user network access points to the network carrier.

17. The method of claim 12 wherein the end user device is a wireless end user device, and the method further comprises providing a wireless connection between the wireless end user device and the end user network access point.

18. The method of claim 17 further comprising providing broadband content to the wireless end user device from the communications network via the end user network access point.

19. The method of claim 17 further comprising enabling a telephone call from the end user device over the communications network.

20. The method of claim 12 further comprising providing additional services to the end user device related to the communications network.

21. The method of claim 20 further comprising tracking the usage of the additional services used by the end user device, wherein tracking the usage of the additional services is performed by the end user network access point.

22. The method of claim 21 further comprising including usage information associated with tracking the usage of the additional services in with the appropriate billing record.

23. The system of claim 1 wherein the communications network is used for a telephone call, transmission of broadband content or other data transmission applications.

24. The system of claim 23 wherein the broadband content is transmitted over a fixed broadband connection comprising a wired device.

25. The system of claim 23 wherein the broadband content is transmitted over a mobile broadband connection comprising a wireless device.

26. The system of claim 23 wherein the telephone call is transmitted at least partially over a VoIP connection.

27. The system of claim 23 wherein the telephone call is transmitted at least partially over a cellular connection.

28. The system of claim 23 wherein the content is secured content.

29. The system of claim 23 wherein the content is unsecured content.

30. The system of claim 23 wherein the content comprises streaming video.

31. The method of claim 12 wherein the communications network is used for a telephone call, transmission of broadband content or other data transmission applications.

32. The method of claim 31 wherein the broadband content is transmitted over a fixed broadband connection comprising a wired device.

33. The method of claim 31 wherein the broadband content is transmitted over a mobile broadband connection comprising a wireless device.

34. The method of claim 31 wherein the telephone call is transmitted at least partially over a VoIP connection.

35. The method of claim 31 wherein the telephone call is transmitted at least partially over a cellular connection.

36. The method of claim 31 wherein the content is secured content.

37. The method of claim 31 wherein the content is unsecured content.

38. The method of claim 31 wherein the content comprises streaming video.

39. A system to selectively generate income from use of an end user network access point, the system comprising:
   a. one or more end user devices;
   b. one or more network nodes including an end user network access point in communication with the one or more end user devices, wherein the one or more network nodes provide the one or more end user devices access to a communications network with the end user network access point being the initial point of access to the communications network, further wherein the end user network access point includes a switching module that collects usage information including first end user identification information associated with each end user device that accesses the communications network via the end user network access point;
   c. a data center in communication with the end user network access point, wherein the end user network access point transmits the usage information to the data center to be stored as a record; and
   d. a network carrier of the communications network to receive the record, to charge one or more of the end user devices based on the record and to selectively provide an income from use of the end user network access point, associated with the record, wherein the income is provided to an entity other than the network carrier, wherein the data center matches the first end user identification information of the usage information to second end user identification information received from the network carrier corresponding to the communications network to form the record.

40. The system of claim 39 wherein the income is provided to an owner of the end user network access point approved by a control entity.

41. The system of claim 39 further comprising a plurality of end user network access points coupled to the data center, wherein the data center receives usage information transmitted from each of the plurality of end user network access points.

42. The system of claim 39 wherein the one or more end user devices are wireless end user devices and the one or more wireless end user devices are in communication with the end user network access point via wireless connections.

43. The system of claim 39 wherein the end user network access point enables transmission of broadband content to the one or more end user devices.

44. The system of claim 39 wherein the communications network is a VoIP compatible network and the end user network access point is a VoIP compatible network access point.

45. The system of claim 39 wherein the end user network access point enables a telephone call from one of the one or more end user devices over the communications network.

46. The system of claim 39 further comprising a data terminal in communication with the data center, wherein the data terminal is associated with the network carrier and the network carrier operates the communications network, further wherein the data center receives user information associated with users of the one or more end user devices from the data terminal and matches the user information to the usage information to form the record.

47. The system of claim 39 wherein the communications network is used for a telephone call, transmission of broadband content or other data transmission applications.

48. The system of claim 47 wherein the broadband content is transmitted over a fixed broadband connection comprising a wired device.

49. The system of claim 47 wherein the broadband content is transmitted over a mobile broadband connection comprising a wireless device.

50. The system of claim 47 wherein the telephone call is transmitted at least partially over a VoIP connection.

51. A method of selectively generating income from use of an end user network access point, the method comprising:
   a. providing an end user device access to a communications network via one or more network nodes including the end user network access point, with the end user network access point being the initial point of access to the communications network;
   b. utilizing one or more services associated with the communications network by the end user device;
   c. tracking usage of the one or more services as usage information including first end user identification, wherein tracking is performed by the end user network access point;
   d. matching the first end user identification information of the usage information to second end user identification information received from a network carrier corresponding to the communications network to form a record;

e. transmitting the record to a network carrier corresponding to the communications network; and f. selectively providing income from use of the end user network access point by the network carrier in relation to the record, wherein the income is provided to an entity other than the network carrier.

52. The method of claim 51 wherein the income is provided to an owner of the end user access point approved by a control entity.

53. The method of claim 51 further comprising charging a user of the end user device according to the record.

54. The method of claim 51 wherein the end user device is a wireless end user device, and the method further comprises providing a wireless connection between the wireless end user device and the end user network access point.

55. The method of claim 54 further comprising providing broadband content to the wireless end user device from the communications network via the end user network access point.

56. The method of claim 54 further comprising enabling a telephone call from the end user device over the communications network.

57. The method of claim 51 further comprising providing additional services to the end user device related to the communications network.

58. The method of claim 51 wherein the communications network is used for a telephone call, transmission of broadband content or other data transmission applications.

59. The method of claim 58 wherein the broadband content is transmitted over a fixed broadband connection comprising a wired device.

60. The method of claim 58 wherein the broadband content is transmitted over a mobile broadband connection comprising a wireless device.

61. The method of claim 58 wherein the telephone call is transmitted at least partially over a VoIP connection.

* * * * *

UNITED STATES PATENT AND TRADEMARK OFFICE
CERTIFICATE OF CORRECTION

| | | |
|---|---|---|
| PATENT NO. | : 9,553,996 B2 | Page 1 of 1 |
| APPLICATION NO. | : 14/869520 | |
| DATED | : January 24, 2017 | |
| INVENTOR(S) | : Vasudevan Ganesan | |

It is certified that error appears in the above-identified patent and that said Letters Patent is hereby corrected as shown below:

In the Specification

Column 2 at Line 34; the phrase "the resulting FREE 802.11x" should read -- the resulting IEEE 802.11x --.

Column 7 at Line 54; the phrase "agreed upon parameters, as" should read -- agreed upon parameters, such as --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*